US010313118B2

(12) United States Patent
Mullender et al.

(10) Patent No.: US 10,313,118 B2
(45) Date of Patent: Jun. 4, 2019

(54) AUTHENTICATED ACCESS TO CACHEABLE SENSOR INFORMATION IN INFORMATION CENTRIC DATA NETWORK

(71) Applicant: Cisco Technology, Inc., San Jose, CA (US)

(72) Inventors: Sape Jurriën Mullender, Amsterdam (NL); Hendrikus Bosch, Aalsmeer (NL); David Lake, West Sussex (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 209 days.

(21) Appl. No.: 15/336,722

(22) Filed: Oct. 27, 2016

(65) Prior Publication Data
US 2018/0124053 A1 May 3, 2018

(51) Int. Cl.
*H04L 29/06* (2006.01)
*H04L 9/08* (2006.01)
(Continued)

(52) U.S. Cl.
CPC ............... *H04L 9/088* (2013.01); *H04L 9/12* (2013.01); *H04L 9/3297* (2013.01); *H04L 63/08* (2013.01);
(Continued)

(58) Field of Classification Search
CPC ......... H04L 63/10; H04L 9/088; H04L 63/08; H04L 2463/121; H04L 63/0435;
(Continued)

(56) References Cited

U.S. PATENT DOCUMENTS 5,768,170 A 6/1998 Smith
6,898,709 B1 * 5/2005 Teppler ................. H04L 9/3263
713/178
(Continued)

OTHER PUBLICATIONS

M'Raihi, "TOTP: Time-Based One-Time Password Algorithm", Internet Engineering Task Force (IETF), Request for Comments: 6238, May 2011, pp. 1-16.
(Continued)

*Primary Examiner* — Yogesh Paliwal
(74) *Attorney, Agent, or Firm* — Leon R. Turkevich (57) ABSTRACT

In one embodiment, a method comprises: receiving, by a requestor device in a data network, authentication request parameters for generating a secured request for a data object, the authentication request parameters comprising a shared encryption key and a prescribed update time interval value; generating, by the requestor device, the secured request based on generating a reduced-resolution time value by dividing a current device timestamp value of the requestor device by the prescribed update time interval value, and encrypting the reduced-resolution time value using the shared encryption key; and outputting, by the requestor device, the secured request specifying an object name identifying the data object and the encrypted reduced-resolution time value, enabling a content supplier device to authenticate the secured request based on determining whether the reduced-resolution time value, multiplied by the prescribed update time interval, substantially matches a corresponding timestamp value of the content supplier device.

20 Claims, 5 Drawing Sheets

(51) Int. Cl.
    H04L 29/08    (2006.01)
    H04W 4/38    (2018.01)
    H04L 9/12    (2006.01)
    H04L 9/32    (2006.01)

(52) U.S. Cl.
    CPC ........ H04L 67/125 (2013.01); H04L 67/2842 (2013.01); H04W 4/38 (2018.02); *H04L 2463/121* (2013.01)

(58) Field of Classification Search
    CPC ....... H04L 9/3297; H04L 9/0861; H04L 9/12; H04L 67/125; H04L 67/2842; H04W 12/08; H04W 48/16; H04W 4/38
    USPC .......................................................... 713/168
    See application file for complete search history.

(56) References Cited

U.S. PATENT DOCUMENTS

| | | | |
|---|---|---|---|
| 8,891,541 | B2 | 11/2014 | Calo et al. |
| 9,076,006 | B1* | 7/2015 | Saylor .................. G06F 21/606 |
| 9,237,015 | B2* | 1/2016 | McGrew .................. H04L 9/30 |
| 9,282,050 | B2 | 3/2016 | Mosko |
| 9,407,432 | B2* | 8/2016 | Uzun .................. H04L 9/0822 |
| 2005/0084106 | A1* | 4/2005 | Venema .............. G06F 21/6209 380/239 |
| 2005/0138372 | A1* | 6/2005 | Kajihara ................. H04L 63/04 713/165 |
| 2005/0160272 | A1* | 7/2005 | Teppler .................... H04L 9/12 713/178 |
| 2013/0007471 | A1* | 1/2013 | Grab ....................... G06F 21/10 713/193 |
| 2015/0270957 | A1* | 9/2015 | Uzun .................... H04L 9/0822 713/168 |
| 2016/0182680 | A1* | 6/2016 | Stapp .................. H04L 67/2842 709/217 |
| 2016/0205034 | A1 | 7/2016 | Solis et al. |

OTHER PUBLICATIONS

Wikipedia, "Content centric networking", [online], Apr. 24, 2016, [retrieved on Aug. 9, 2016]. Retrieved from the Internet: <URL: https://en.wikipedia.org/w/index.php?title=Content_centric_networking&printable=yes>, pp. 1-5.

Wikipedia, "Information-centric networking", [online], Jun. 29, 2016, [retrieved on Aug. 9, 2016]. Retrieved from the Inernet: <URL: https://en.wikipedia.org/w/index.php?title=Information-centric_networking&printable=yes>, pp. 1-2.

Wikipedia, "Named data networking", [online], Jul. 22, 2016, [retrieved on Aug. 9, 2016]. Retrieved from the Internet: <URL: https://en.wikipedia.org/w/index.php?title=Named_data_networking&printable=yes>, pp. 1-9.

Wikipedia, "Time-based One-time Password Algorithm", [online], Jul. 1, 2016, [retrieved on Aug. 9, 2016]. Retrieved from the Internet: <URL: https://en.wikipedia.org/w/index.php?title=Time-based_One-time_Password_Algorithm&printable=yes., pp. 1-5.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Wolfram Mathworld (Archive.org), "Integer Division" [online], Mar. 16, 2016, [retrieved on Jun. 13, 2018]. Retrieved from the Internet: <URL: "https://web.archive.org/web/20160316215900/http://mathworld.wolfram.com/IntegerDivision.html">, 1 page.

* cited by examiner

AUTHENTICATED ACCESS TO CACHEABLE SENSOR INFORMATION IN INFORMATION CENTRIC DATA NETWORK

TECHNICAL FIELD

The present disclosure generally relates to authenticated access to cacheable sensor information in an information centric data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Consumers in an Information-Centric Network (ICN) (e.g., CCNx, NDN) can express interest in named content by sending an "interest" packet containing the name of the content through a series of one or more router devices to a content producer such as a sensor device in a sensor data network. In response to the content producer returning a content packet, router devices along the path can cache the content for other consumers to fetch.

In sensor networks, a battery-powered sensor operating as a content producer and connected to a router via a wireless link can rely on the router to cache sensor readings to reduce the number of requests that the sensor must satisfy from consumers.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: receiving, by a requestor device in a data network, authentication request parameters for generating a secured request for a data object, the authentication request parameters comprising a shared encryption key and a prescribed update time interval value; generating, by the requestor device, the secured request based on generating a reduced-resolution time value by dividing a current device timestamp value of the requestor device by the prescribed update time interval value, and encrypting the reduced-resolution time value using the shared encryption key; and outputting, by the requestor device, the secured request specifying an object name identifying the data object and the encrypted reduced-resolution time value, enabling a content supplier device to authenticate the secured request based on determining whether the reduced-resolution time value, multiplied by the prescribed update time interval, substantially matches a corresponding timestamp value of the content supplier device.

In another embodiment, an apparatus comprises a device interface circuit, a clock circuit, and a processor circuit. The device interface circuit is configured for receiving, in a data network, authentication request parameters for generating a secured request for a data object, the authentication request parameters comprising a shared encryption key and a prescribed update time interval value. The clock circuit is configured for generating a current device timestamp value. The processor circuit is configured for generating the secured request based on generating a reduced-resolution time value by dividing the current device timestamp value by the prescribed update time interval value, and encrypting the reduced-resolution time value using the shared encryption key. The device interface circuit further is configured for outputting the secured request specifying an object name identifying the data object and the encrypted reduced-resolution time value, enabling a content supplier device to authenticate the secured request based on determining whether the reduced-resolution time value, multiplied by the prescribed update time interval, substantially matches a corresponding timestamp value of the content supplier device.

In another embodiment, one or more non-transitory tangible media are encoded with logic for execution by a machine and when executed by the machine operable for: receiving, by the machine implemented as a requestor device in a data network, authentication request parameters for generating a secured request for a data object, the authentication request parameters comprising a shared encryption key and a prescribed update time interval value; generating, by the requestor device, the secured request based on generating a reduced-resolution time value by dividing a current device timestamp value of the requestor device by the prescribed update time interval value, and encrypting the reduced-resolution time value using the shared encryption key; and outputting, by the requestor device, the secured request specifying an object name identifying the data object and the encrypted reduced-resolution time value, enabling a content supplier device to authenticate the secured request based on determining whether the reduced-resolution time value, multiplied by the prescribed update time interval, substantially matches a corresponding timestamp value of the content supplier device.

In another embodiment, a method comprises: receiving, by a content supplier device in a data network, a secured request for a data object, the secured request including an object name identifying the data object and an encrypted portion; decrypting the encrypted portion into a decrypted value using an encryption key stored by the content supplier device and associated with the data object; and selectively authenticating the secured request in response to determining the decrypted value, multiplied by a prescribed update time interval value associated with the data object, substantially matches a current device timestamp of the content supplier device.

In another embodiment, an apparatus comprises a device interface circuit, a memory circuit, a clock circuit, and a processor circuit. The device interface circuit is configured for receiving, in a data network, a secured request for a data object. The secured request includes an object name, identifying the data object, and an encrypted portion. The memory circuit is configured for storing an encryption key associated with the data object. The clock circuit is configured for generating a current device timestamp. The processor circuit is configured for decrypting the encrypted portion into a decrypted value using the encryption key. The processor circuit further is configured for selectively authenticating the secured request in response to determining the decrypted value, multiplied by a prescribed update time interval value associated with the data object, substantially matches the current device timestamp.

In another embodiment, one or more non-transitory tangible media are encoded with logic for execution by a machine and when executed by the machine operable for: receiving, by the machine implemented as a content supplier device in a data network, a secured request for a data object, the secured request including an object name identifying the data object and an encrypted portion; decrypting the encrypted portion into a decrypted value using an encryption key stored by the content supplier device and associated with the data object; and selectively authenticating the secured request in response to determining the decrypted value, multiplied by a prescribed update time interval value associated with the data object, substantially matches a current device timestamp of the content supplier device.

DETAILED DESCRIPTION

Particular embodiments utilize authentication parameters that include a prescribed update time interval value. The prescribed update time interval value can establish a reduced-resolution time value, relative to a device timestamp value, for generation of a time-based encrypted value that can be used throughout a data network (e.g., an ICN) for authenticating a secured request for a data object (e.g., a secured "interest" message), and/or authenticating the requested data object.

Hence, numerous network devices in a data network can utilize the prescribed update time interval value to synchronize time-based encrypted values for authentication relative to the reduced-resolution time value; moreover, the prescribed update time interval can have a value corresponding to a data update interval of a data producer device (e.g., a sensor device). Hence, example embodiments enable the secure and coordinated management of authenticated requests from multiple consumer devices, also referred to as requestor devices, by intermediate router devices serving as content supplier devices on behalf of the data producer device. The reduced-resolution time value can establish a "rounded-up" (or modulo) epoch (i.e., time interval) that defines a validity interval for caching or requesting a given data object, before the data object is superseded or replaced by an updated data object by the data producer device.

Hence, duplicate requests for a given data object to the data producer device can be eliminated, based on the intermediate router devices securely caching the data object during a caching interval that can correspond to the prescribed update time interval value.

Further, use of the prescribed update time interval value for generating an encrypted reduced-resolution time value enables generation of a secured message (e.g., a secured request or a secured data object) that cannot be reverse-decrypted by untrusted entities.

Figure 1:
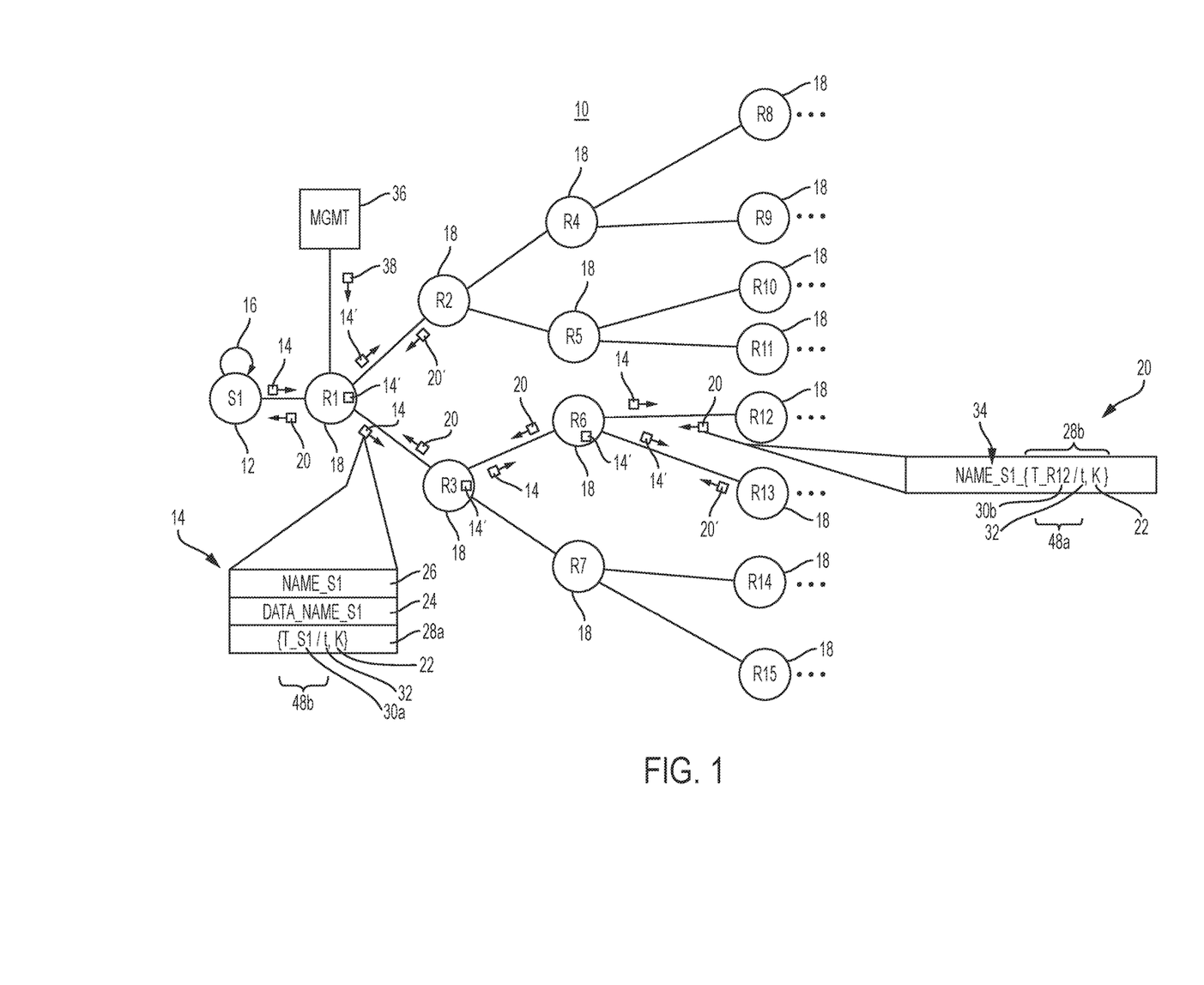
FIG. 1 illustrates an example system having a requestor device generating a secured request for a data object using a time-based encrypted value and a content supplier device authenticating the secured request, relative to a prescribed update time interval value associated with the data object, according to an example embodiment.

FIG. 1 is a diagram illustrating an example data network 10 (e.g., an ICN) having a data producer device (e.g., sensor device "S1") 12 configured for producing secured data objects 14 at a prescribed data update interval 16, and a plurality of requestor devices (e.g., "R1" through "R15", etc.) 18 each configured for generating a secured request 20 for the data object 14 using a time-based encrypted value, according to an example embodiment.

The example data network 10 can be implemented in various forms, for example as a low power lossy network (LLN) operating according to the routing protocol for low power and lossy networks (RPL) as described in RFC 6550. The example data network 10 also can be implemented using a logical (e.g., virtualized) network overlying an existing local area network (LAN) and/or wide area network (WAN), for example according to TCP/IP protocol, etc.; for example, the data network 10 can be implemented as a CCN or NDN network overlying an existing Internet Protocol (IP) based network.

Each requestor device 18 is configured for generating and sending a secured request 20 for a secured data object 14 originated by the prescribed data update interval 16. As described in further detail below, a "secured data object" 14 is based on encryption using a shared key "K" 22: the secured data object 14 can include a data object (e.g., a data structure such as a sensor reading generated by the data producer device 12, e.g., "DATA_NAME_S1") 24, a corresponding "name" (e.g., "NAME_S1") 26 (also referred to as an "object name"), and an encrypted portion "{T_S1/t, K}" 28a having been encrypted based on a current timestamp value "T_S1" 30a of the data producer device 12, relative to a prescribed update time interval value "t" 32, and using a shared encryption key "K" 22. Similarly, the secured request 20 generated by a requestor device (e.g., "R12") 18 can comprise the content request (also referred to as an "interest") (e.g., "NAME_S1") 34 corresponding to the object name 26, and an encrypted portion "{T_R12/t, K}" 28b having been encrypted based on the current timestamp value "T_R12" 30b of the requestor device "R12" 18, relative to the update time interval value "t" 32, and using the shared encryption key "K" 22. Hence, the shared encryption key "K" 22 enables a requestor device 18 to authenticate the secured data object 14 as having been originated from the data producer device 12, and enables the data producer device 12 to authenticate the secured request 20 as having been originated by an authenticated requestor device 18.

As described in further detail below, a requestor device 18 can cache the secured data object 14 upon receipt thereof after authentication, enabling a requestor device (e.g., "R1") 18 to forward the cached copy 14' of the secured data object 14 to other requestor devices (e.g., "R2"), minimizing the number of secured requests 20 that need to be sent to the data producer device 12. As illustrated in FIG. 1, a secured request 20 can initially be generated and transmitted by the requestor device "R12" to its next-hop router device "R6" 18; in response to the router device "R6" 18 determining it has no cache entry responsive to the secured request 20 (described below), the router device "R6" can forward the secured request 20 to its next-hop router device "R3" 18; similarly, the router devices "R3" and "R1" 18 can forward the secured request 20 toward the data producer device 12 based on a determined lack of any cache entry in the respective router devices "R3" and "R1", causing the data producer device 12 to respond to the secured request 20 by outputting a secured data object 14, described below.

Hence, the requestor device "R1" 18 can forward the secured data object 14 (following authentication thereof, described below) in response to the pending secured request 20, and cache the secured data object 14 as a cached secured data object 14'. The requestor devices "R3" and "R6"

similarly can cache the received secured data object 14 in response to receipt thereof (following authentication), and forward the secured data object 14 responsive to the pending secured requests 20 initiated by the requestor device "R12".

Hence, the caching of the secured data object 14 enables the requestor devices (e.g., "R1", "R3", and "R6") 18 to respond to subsequent secured requests 20' (e.g., from the requestor devices "R2" and "R13" 18) by outputting the cached secured data object 14'.

According to example embodiments, a data object 24 (e.g., a data object, an "interest" in an ICN) is named and authenticated using encryption based on the shared encryption key "K" 22 to generate an encrypted value of time "{T/t, K}". In particular, a sensor node (as data producer) or another authorized entity such as a management entity 36 can provide authentication request parameters 38 for generating a secured request 20 for a data object 24: the authentication request parameters 38 can include the shared encryption key "K" 22 and/or the update time interval value "t" 32. The update time interval value "t" 32 can represent the prescribed data update interval 16 for the data producer device 12, for example a sensor update time "t" that can correspond to the time interval between which the sensor node acquires new data (e.g., every minute, every five minutes, every hour, etc.).

As described in further detail below, the encrypted value of time "{T/t, K}" is generated based on dividing the current time stamp "T" of a network device 12, 18 by the update time interval value "t" 32 (i.e., T/t), and encrypting the division result "T/t" with the shared encryption key "K" 22.

Hence, the authentication request parameters 38 (containing the shared encryption key "K" 22 and/or the update time interval value "t" 32) can be shared with each authenticated consumer device 18. The data producer device 12 also can optionally share the object name 26 to enable the requestor devices 18 to generate the content request 34 (alternately, a requestor device 18 can use a name in the content request 34 that is interpreted by the data producer device 12).

Hence, all authenticated consumer devices 18 can know the object name (e.g., "NAME_S1") 26 used to request the data object 24 from the data producer device (e.g., "S1") 12, the shared encryption key "K" 22, and update time interval value "t" 32. Consequently, an authenticated consumer (e.g., "R12") 18 can request data from the data producer device 12 (or from an intermediate network device serving as a cache) based on generating an encrypted value of time by dividing its corresponding current timestamp value (e.g., "T_R12") 30b (e.g., a UTC-based timestamp) by the update time interval value "t" 32 resulting in a reduced-resolution time value ("T_R12/t") 48a, and encrypting the reduced-resolution time value 48a with the shared encryption key "K" 22, resulting in the encrypted portion "{T_R12/t, K}" 28b; the encrypted portion 28b can be appended to the content request "NAME_S1" 34 resulting in the secured request "NAME_S1_{T_R12/t, K}" 20. The secured request "NAME_S1_{T_R12/t, K}" 20 can then be output by the requestor device "R12" to the data producer device 12 via the intermediate network devices "R6", "R3", and "R1", assuming none of the intermediate network devices have stored a cached secured data object 14'.

In response to receiving the secured request "NAME_S1_{T_R12/t, K}" 20 (also referred to as a secured interest name), the data producer device 12 can decrypt the encrypted portion 28b using the shared encryption key "K" 22, and determine if the decrypted value "D", multiplied by the update time interval value "t" 32, substantially matches the corresponding current timestamp value 30 of the data producer device 12 based on falling within an acceptable range "r" of its local time "T_S1", i.e.:

$$(T\_S1-r) \leq D*t \leq (T\_S1+r),$$

where "r" is a constant used to adjust for acceptable clock drift (the symbol "*" refers to a multiplication operator).

Hence, the data producer device 12 can authenticate the secured request "NAME_S1_{T_R12/t, K}" 20 if the reduced-resolution time value "T_R12/t" calculated by the requestor device "R12" 18 (detected by the data producer device 12 as the decrypted value "D"), multiplied by the update time interval value "t" 32, substantially matches the corresponding current timestamp value 30a of the data producer device 12. In response to authenticating the secured request 20, the data producer device 12 can generate and output the secured data object 14, described below.

Hence, the example embodiments guarantee that different authenticated consumers can send identical reduced-resolution time value within the same time interval of "t" seconds, allowing a scalable authentication by the data producer device 12. As apparent from the foregoing, the example embodiments also enable the intermediate router devices (e.g., "R1" through "R7") 18 to cache the received secured data object 14, and respond to incoming secured requests 20 specifying the same content request 34.

Moreover, use of the reduced-resolution time value (e.g., 48a, 48b) guarantees that a given secured request 20 is only valid for a limited period of time, namely the time interval established by the update time interval value "t" 32. As described previously, the update time interval value "t" 32 can correspond to the prescribed data update interval 16 of the data producer device 12, ensuring that aged data objects 24 that are cached in any intermediate router devices 18 are no longer valid after the update time interval value "t" 32, since the encrypted portion 28 will change after every time interval as defined by the update time interval value "t" 32. Further, the intermediate router devices 18 can set a cache expiration interval based on the update time interval value "t" 32, ensuring any stale data is flushed from their cache.

Further, use of a current timestamp value 30, divided by the update time interval value "t" 32, guarantees that the time-based encrypted portion 28 is changed after every update time interval value "t" 32, preventing rogue or suspicious devices from attempting to decipher the encrypted portions 28.

Figure 2:
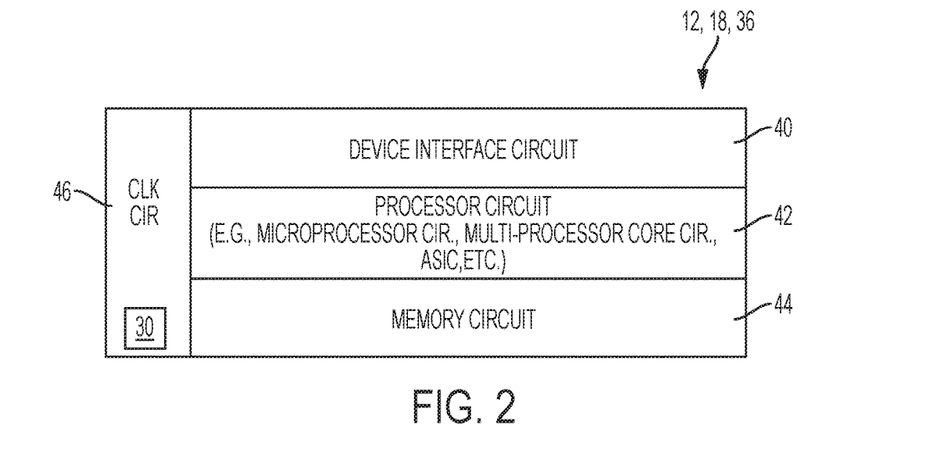
FIG. 2 illustrates an example of any one of the requestor device or the content supplier device, according to an example embodiment.

FIG. 2 illustrates an example implementation of any one of the devices 12, 18, and/or 36 of FIG. 1, according to an example embodiment. Each apparatus 12, 18, 36 is a physical machine (i.e., a hardware device) configured for implementing network communications with other physical machines via the data network 10. The term "configured for" or "configured to" as used herein with respect to a specified operation refers to a device and/or machine that is physically constructed and arranged to perform the specified operation. Hence, each apparatus 12, 18, 36 is a network-enabled machine implementing network communications via the network 10.

Each apparatus 12, 18, and/or 36 can include a device interface circuit 40, a processor circuit 42, a memory circuit 44, and a clock circuit 46. The device interface circuit 40 can include one or more distinct physical layer transceivers for communication with any one of the other devices 12, 18, and/or 36; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein. The clock circuit 46 is configured for generating a device timestamp value 30, for example a crystal oscillator; the clock circuit 46 also can be integrated within the processor circuit 42, or implemented as part of a GPS receiver circuit obtaining UTC time, etc.

Any of the disclosed circuits of the devices 12, 18, and/or 36 (including the device interface circuit 40, the processor circuit 42, the memory circuit 44, the clock circuit 46, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
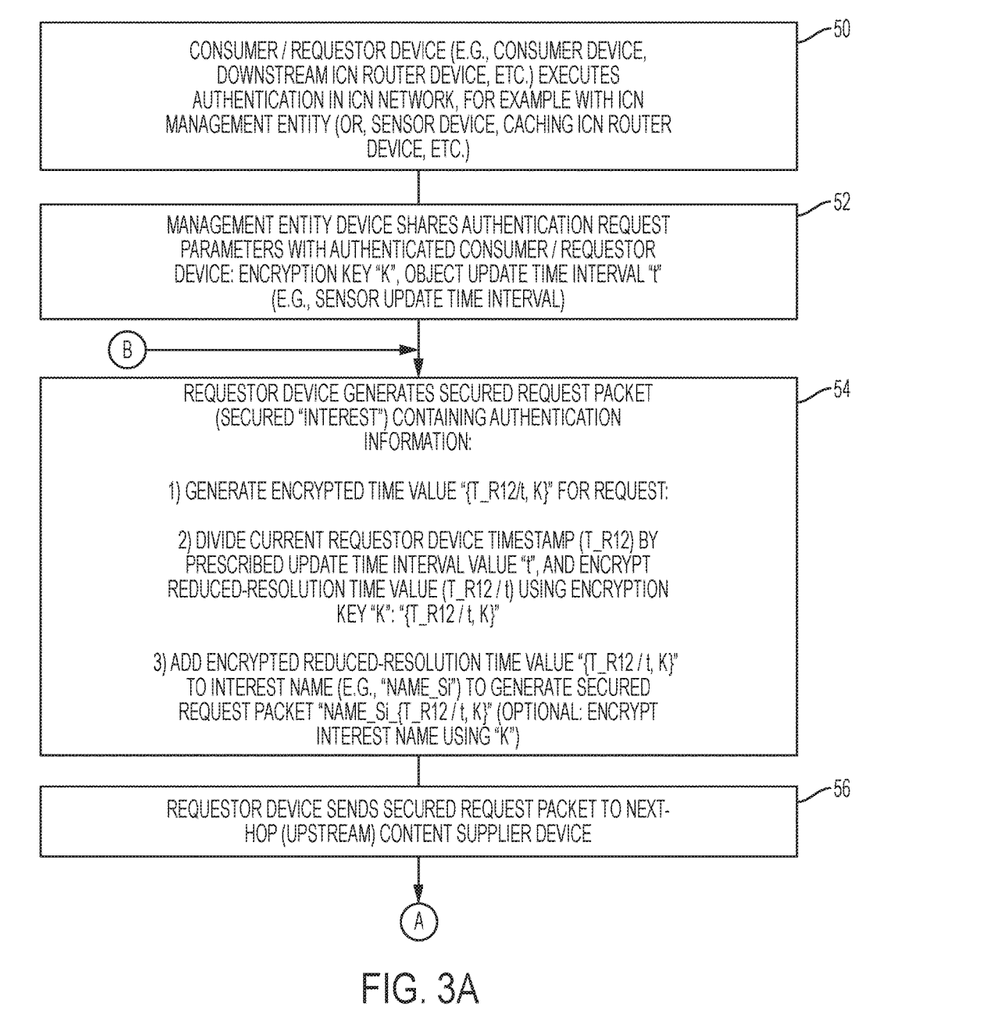
FIGS. 3A, 3B, and 3C illustrate an example method of the requestor device and/or an intermediate network device generating the secured request for the data object, and the content supplier device authenticating the secured request, according to an example embodiment.
Figure 3B:
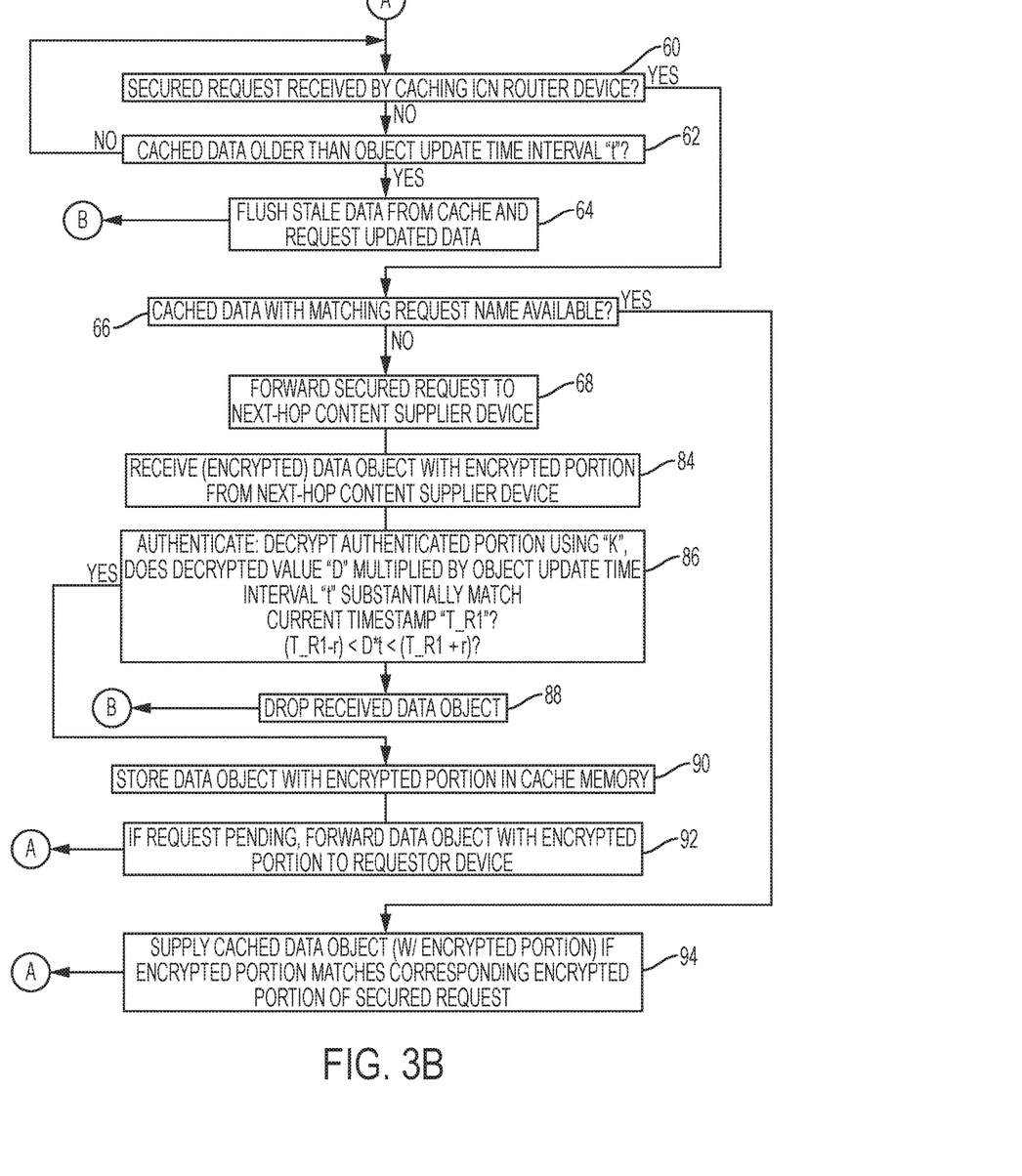
Figure 3C:
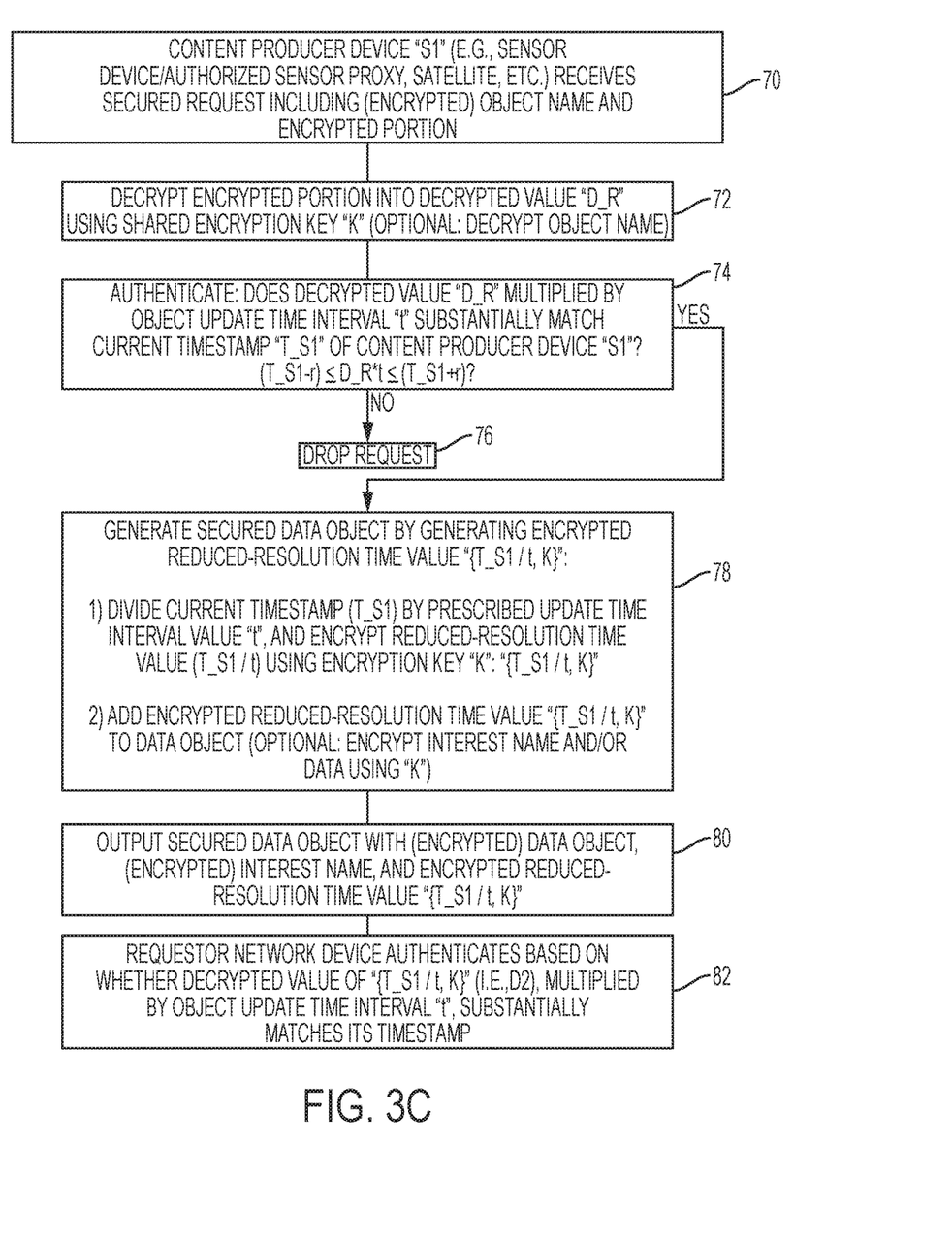

FIGS. 3A, 3B, and 3C illustrate an example methods of a requestor device 18 (including an intermediate network device) generating a secured request 20 for the data object 24, an intermediate network device (e.g., "R6") 18 responding to a received secured request 20, and the content supplier device 12 responding to the secured request 20 based on authenticating the secured request 20 and generating a secured data object 14, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to operation 50, the processor circuit 42 in any of the requestor devices 18 is configured for authenticating with an authoritative device in the data network 10, for example the data producer device 12, the management entity 36, and/or another requestor device 18, for example based on supplying a 256-bit secure token, etc. The processor circuit 42 of any of the requestor devices 18 is configured on operation 52 to receive the authentication request parameters 38 shared by the authoritative device (e.g., the management entity 36) based on successful authentication by the requestor device 18 with the authoritative device. As described previously, the authentication request parameters 38 can include the shared encryption key "K" 22, the update time interval value "t" 32, and/or the object name 26 used to generate the content request 34. As described herein, any one of the data object 24, the object name 26, and/or the content request 34 also can be encrypted using the shared encryption key "K" 22 for improved security.

Any one of the requestor devices (e.g., "R1" through "R15", etc.) 18 in operation 54 can generate a secured request 20 for the data object 24 generated by the data producer device 12. Assuming the requestor device "R12" 18 generates the secured request 20, the processor circuit 42 of the requestor device "R12" 18 in operation 54 generates the secured request 20 based on generating the encrypted time value 28b based on the current timestamp value 30b, the update time interval value "t" 32, and the shared encryption key "K" 22. In particular, the processor circuit 42 of the requestor device "R12" 18 generates a "reduced-resolution" time value "T_R12/t" 48a based on dividing the current timestamp value "T_R12" 30b (obtained from its clock circuit 46) by the update time interval value "t" 32; for example, if the current timestamp value 30b of the requestor device "R12" 18 is "07:23:55" (twenty-four hour clock value updated every second) and the update time interval value "t" 32 has a value of five minutes "00:05:00", the update time interval value "t" 32 would cause the reduced-resolution time value 48a to have a value of "07:20:00" during the timestamp value range of "07:20:00≤T_R12≤07:24:59"; similarly, the update time interval value "t" 32 (having a value of "00:05:00") would cause the reduced-resolution time value 48a to have a value of "07:25:00" during the timestamp value range of "07:25:00≤T_R12≤07:29:59" for the requestor device "R12" 18.

The processor circuit 42 of the requestor device "R12" 18 in operation 54 further is configured for encrypting the reduced resolution time value "T_R12/t" 48a using the shared encryption key "K" 22 according to prescribed encryption techniques, resulting in the encrypted reduced-resolution time value "{T_R12/t, K}" 28b, where the brackets in the operation "{a, b}" represent an encryption operation (e.g., SHA-256 hash) of the operand value "a" using the encryption key "b" (i.e., "a=T_R12/t"; "b=K"). Hence, the encrypted reduced-resolution time value "{T_R12/t, K}" 28b can be appended in operation 54 to the content request "NAME_S1" (i=1 in FIG. 3A) 34, resulting in generation of the secured request 20 by the processor circuit 42. If desired, the content request 34 also can be encrypted using the shared encryption key "K" 22.

The device interface circuit 40 of the requestor device "R12" 18 in operation 56 is configured for outputting the secured request 20 to the next-hop router device "R6" 18.

Referring to FIG. 3B, the device interface circuit 40 of the next-hop router device "R6" 18 in operation 60 is configured for reception of the secured request 20 from the requestor device "R12" and/or "R13". Also note that the processor circuit 42 of each network device 18 is configured for determining in operation 62 whether its cache (e.g., in its corresponding memory circuit 44) has any cached data older than the update time interval value "t" 32; any stale data object older than the update time interval value "t" 32 can be flushed, and the processor circuit 42 of the network device 18 in operation 64 can initiate in operation 64 its own secured request 20 based on execution of operations 54 and 56 in FIG. 3A (as apparent from the foregoing, the secured request 20 is generated based on the updated device timestamp value 30 coinciding with the expiration of the cache interval).

In response to the device interface circuit 40 receiving the secured request 20 from the requestor device "R12" 18, the processor circuit 42 of the next-hop router device "R6" 18 can determine in operation 66 whether its memory circuit 44 stores a cached secured data object 14' having a matching name: note that the processor circuit 42 need not perform any decryption of the received secured request 20, rather the processor circuit 42 can determine a match in its cache if the bit pattern of the corresponding object name 26 (encrypted or not) matches the bit pattern of the content request 34 (encrypted or not), and the bit pattern of the encrypted portion 28a in the cached secured data object 14' matches the encrypted portion 28b of the secured request 20 (or 20').

If in operation 66 the processor circuit 42 of the next-hop router device "R6" 18 determines there is no cached copy available of the secured data object 14 (i.e., the cached secured data object 14'), the processor circuit 42 of the next-hop router device "R6" 18 can forward the secured request 20 to its next-hop content supplier device "R3" 18 in operation 68. The above-described operations can be repeated by the next-hop content supplier devices "R3" and "R1" 18, assuming neither content supplier device "R3" or "R1" has a cached secured data object 14' stored in its corresponding processor circuit 42. Hence, the processor circuit 42 of the content supplier device "R1" 18, in response to receiving the secured request 20 and determining it does not have a cached secured data object 14' stored in its memory circuit 44, can forward the secured request 20 to the data producer device 12.

Referring to FIG. 3C, the device interface circuit 40 of the data producer device 12 in operation 70, as content supplier, is configured for receiving the secured request 20 that includes the content request 34, for example in the form of an object name "NAME_S1" that identifies the data object 24, and the encrypted portion 28b. The data producer device 12 can attempt authentication of the received secured request 20 based on the shared encryption key "K" 22, its current timestamp value 30a, and the update time interval value "t" 32. In particular, the processor circuit 42 of the data producer device 12 in operation 72 can decrypt the encrypted portion 28b into a decrypted value "D_R" using the shared encryption key "K" 22 stored by the data producer device 12 in its corresponding memory circuit 44. The processor circuit 42 of the data producer device 12 determines in operation 74 whether the decrypted value "D_R", when multiplied by the update time interval value "t" 32 to generate the product "D_R*t", substantially matches the current timestamp value "T_S1" 30a (using the parameter "r" to accommodate clock drift):

$$(T\_S1-r) \le D\_R * t \le (T\_S1+r).$$

As described previously, the processor circuit 42 should detect a match if the secured request 20 is generated within the time interval specified by the update time interval value "t" 32, else the secured request 20 is a stale request and dropped in operation 76.

If in operation 74 the processor circuit 42 of the data producer device 12 detects a substantial match, the processor circuit 42 of the data producer device 12 in operation 78 can generate a secured data object 14 based on generating its corresponding reduced-resolution time value "T_S1/t" 48b, and encrypting the reduced-resolution time value 48b with the shared encryption key "K" 22 to generate the encrypted reduced-resolution time value {T_S1/t, K} 28a. As described previously with respect to operation 54 of FIG. 5A, the processor circuit 42 of the data producer device 12 in operation 78 can divide the current timestamp value "T_S1" 30a of the data producer device 12 by the update time interval value "t" 32 to generate the reduced-resolution time value 48b, and encrypt the reduced-resolution time value 48b using the shared encryption key "K" 22. The processor circuit 42 of the data producer device 12 can add the encrypted reduced-resolution time value {T_S1/t, K} 28a to the data object 24 and the object name 26 for generation of the secured data object 14, and the device interface circuit 40 of the data producer device 12 can output the secured data object 14 to its next-hop head-end router device "R1" 18 in operation 80. As described previously, the data object 24 and the object name 26 also can be encrypted using the shared encryption key "K" 22.

As described in further detail below with respect to FIG. 3B, each requestor device 18 receiving the secured data object 14 (or the cached secured data object 14') in operation 82 can attempt authentication of the received secured data object 14 based on the encryption of the reduced-resolution time values, based on determining whether the decrypted value (e.g. "D2" in operation 82) of the encrypted portion "{T_S1/t, K}" 28a, multiplied by the update time interval value "t" 32, substantially matches the current timestamp value 30 of the receiving requestor device 18.

Referring to FIG. 3B, in response to the device interface circuit 40 receiving the secured data object 14 in operation 84, the processor circuit 42 of the receiving requestor device (e.g., "R1") 18 in operation 86 can attempt authentication based on decrypting the encrypted portion 28a using the shared encryption key "K" 22, and determining whether the decrypted value ("D" in operation 86), when multiplied by the update time interval value "t" 32, substantially matches the current timestamp value "T_R1" of the receiving requestor device (e.g., "121"):

$$(T\_R1-r) \leq D*t \leq (T\_R1+r).$$

If in operation 86 no substantial match is found, the received secured data object 14 is dropped in operation 88.

If in operation 86 the processor circuit 42 of the receiving requestor device (e.g., "R1") detects a substantial match, the processor circuit 42 stores in operation 90 the secured data object 14 as a cached secured data object 14' in its memory circuit 44, and in operation 92 causes the device interface circuit 40 to forward the secured data object 14 to a "downstream" requestor device (e.g., "R3") 18 in response to detecting a pending secured request 20 in operation 92.

The next-hop "downstream" requestor device "R3" 18 can repeat operations 84, 86, 90, and 92 in response to receiving the secured data object 14 from its content supplier device "R1" 18, and forward the secured data object 14 after authentication to its "downstream" requestor device "R6" 18; similarly, the downstream requestor device "R6" can repeat operations 84, 86, 90, and 92 in response to receiving the secured data object 14 from its content supplier device "R3", and forward the secured data object 14 (after authentication) to its "downstream" requestor device "R12" 18 (the network device "R12" can repeat operations 84, 86, 90, and 92, etc.).

Hence, the example embodiments enable authenticated access to the data object 24, while minimizing access attempts to the data producer device 12 based on the successive caching of the cached secured data object 14' by each of the network devices 18 having received and authenticated the secured data object 14 or its cached copy 14'. As apparent from the tree-based topology in FIG. 1, the data producer device 12 needs to respond to only one of the secured data objects 14 generated for a given name 34 during the update time interval value "t" 32, since the first-hop requestor device "R1" that is coupled to the data producer device 12 (e.g., serving as a "head-end" in the data network 10), can cache the received secured data object 14 in its memory circuit 44 following authentication, and output the cached secured data object 14' in response to any subsequent secured request 20'. Hence, the processor circuit 42 of any of the requestor devices "R1", "R3", "R6" or "R12" can respond in operation 66 of FIG. 3B to a subsequent secured request 20' for the identical content request 34 by outputting the cached secured data object 14' stored in its memory circuit 44 in operation 94.

According to example embodiments, authenticated consumer devices can obtain secured data objects using time-based encryption that utilizes update time interval values to establish a "valid lifetime" (or "epoch") for cached versions of the data objects data network. The update time interval ensures that encrypted data is regularly changed to avoid counter-detection, and also ensures that stale cached data is flushed (deleted) from intermediate network devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a requestor device in a data network, authentication request parameters for generating a secured request for a data object, the authentication request parameters comprising a shared encryption key and a prescribed update time interval value;
generating, by the requestor device, the secured request based on generating a reduced-resolution time value by reducing a resolution of a current device timestamp value of the requestor device to the prescribed update time interval value, and encrypting the reduced-resolution time value using the shared encryption key, the resolution of the current device timestamp value based on a corresponding update interval that is less than the prescribed update time interval value; and
outputting, by the requestor device, the secured request specifying an object name identifying the data object and the encrypted reduced-resolution time value, enabling a content supplier device to authenticate the secured request based on determining whether the reduced-resolution time value is within a range of a corresponding timestamp value of the content supplier device relative to the prescribed update time interval value.

2. The method of claim 1, further comprising the requestor device authenticating with an authoritative device in the data network, the receiving of the authentication request parameters based on the authenticating with the authoritative device.

3. The method of claim 1, further comprising:
receiving the data object with an encrypted portion;
attempting authentication of the data object; and
storing the data object in response to successful authentication of the data object.

4. The method of claim 3, wherein the attempting authentication comprises:
decrypting the encrypted portion supplied with the data object into a decrypted value using the shared encryption key; and
selectively authenticating the data object in response to determining the decrypted value is within a range of a corresponding updated device timestamp value of the requestor device relative to the prescribed update time interval value.

5. The method of claim 1, further comprising:
receiving the data object with an encrypted portion;
caching the data object and the encrypted portion for a prescribed cache interval in a memory circuit;
receiving a second secured request from a second requestor device, the second secured request including a second encrypted portion;
selectively supplying the data object, and the encrypted portion, to the second requestor device in response to determining the encrypted portion matches the second encrypted portion; and
flushing the cached data object and generating and outputting a second secured request for the data object, generated based on an updated device timestamp value of the requestor device, following expiration of the prescribed cache interval.

6. An apparatus comprising:
a device interface circuit configured for receiving, in a data network, authentication request parameters for generating a secured request for a data object, the authentication request parameters comprising a shared encryption key and a prescribed update time interval value;

a clock circuit configured for generating a current device timestamp value; and a processor circuit configured for generating the secured request based on generating a reduced-resolution time value by reducing a resolution of the current device timestamp value to the prescribed update time interval value, and encrypting the reduced-resolution time value using the shared encryption key, the resolution of the current device timestamp value based on a corresponding update interval that is less than the prescribed update time interval value;

the device interface circuit further configured for outputting the secured request specifying an object name identifying the data object and the encrypted reduced-resolution time value, enabling a content supplier device to authenticate the secured request based on determining whether the reduced-resolution time value is within a range of a corresponding timestamp value of the content supplier device relative to the prescribed update time interval value.

7. The apparatus of claim 6, wherein the processor circuit is configured for authenticating with an authoritative device in the data network, the receiving of the authentication request parameters based on the authenticating with the authoritative device.

8. The apparatus of claim 6, wherein:
the device interface circuit is configured for receiving the data object with an encrypted portion;
the processor circuit further configured for attempting authentication of the data object;
the apparatus further comprising a memory circuit configured for storing the authentication request parameters, the memory circuit further configured for storing the data object in response to successful authentication of the data object by the processor circuit.

9. The apparatus of claim 8, wherein the processor circuit is configured for attempting authentication based on:
decrypting the encrypted portion supplied with the data object into a decrypted value using the shared encryption key stored in the memory circuit; and
selectively authenticating the data object in response to determining the decrypted value is within a range of a corresponding updated device timestamp value generated by the clock circuit relative to the prescribed update time interval value.

10. The apparatus of claim 6, wherein the device interface circuit is configured for receiving the data object with an encrypted portion, the apparatus further comprising:
a memory circuit configured for caching the data object and the encrypted portion for a prescribed cache interval;
the device interface circuit further configured for receiving a second secured request from a second requestor device, the second secured request including a second encrypted portion;
the processor circuit configured for selectively supplying the data object, and the encrypted portion, to the second requestor device in response to determining the encrypted portion matches the second encrypted portion;
the processor circuit further configured for flushing the cached data object, and generating and outputting a second secured request for the data object, based on an updated device timestamp value of the clock circuit, following expiration of the prescribed cache interval.

11. One or more non-transitory tangible media encoded with logic for execution by a machine and when executed by the machine operable for:
receiving, by the machine implemented as a requestor device in a data network, authentication request parameters for generating a secured request for a data object, the authentication request parameters comprising a shared encryption key and a prescribed update time interval value;
generating, by the requestor device, the secured request based on generating a reduced-resolution time value by reducing a resolution of a current device timestamp value of the requestor device to the prescribed update time interval value, and encrypting the reduced-resolution time value using the shared encryption key, the resolution of the current device timestamp value based on a corresponding update interval that is less than the prescribed update time interval value; and
outputting, by the requestor device, the secured request specifying an object name identifying the data object and the encrypted reduced-resolution time value, enabling a content supplier device to authenticate the secured request based on determining whether the reduced-resolution time value is within a range of a corresponding timestamp value of the content supplier device relative to the prescribed update time interval value.

12. The one or more non-transitory tangible media of claim 11, further operable for authenticating with an authoritative device in the data network, the receiving of the authentication request parameters based on the authenticating with the authoritative device.

13. The one or more non-transitory tangible media of claim 11, further operable for:
receiving the data object with an encrypted portion;
attempting authentication of the data object; and
storing the data object in response to successful authentication of the data object.

14. The one or more non-transitory tangible media of claim 13, wherein the attempting authentication comprises:
decrypting the encrypted portion supplied with the data object into a decrypted value using the shared encryption key; and
selectively authenticating the data object in response to determining the decrypted value is within a range of a corresponding updated device timestamp value of the requestor device relative to the prescribed update time interval value.

15. The one or more non-transitory tangible media of claim 11, further operable for:
receiving the data object with an encrypted portion;
caching the data object and the encrypted portion for a prescribed cache interval in a memory circuit;
receiving a second secured request from a second requestor device, the second secured request including a second encrypted portion;
selectively supplying the data object, and the encrypted portion, to the second requestor device in response to determining the encrypted portion matches the second encrypted portion; and
flushing the cached data object and generating and outputting a second secured request for the data object, generated based on an updated device timestamp value of the requestor device, following expiration of the prescribed cache interval.

16. A method comprising:
receiving, by a content supplier device in a data network, a secured request for a data object, the secured request including an object name identifying the data object and an encrypted portion;
decrypting the encrypted portion into a decrypted value using an encryption key stored by the content supplier device and associated with the data object; and
selectively authenticating the secured request in response to determining the decrypted value is within a range of a current device timestamp of the content supplier device relative to a prescribed update time interval value associated with the data object and used to establish a reduced-resolution time value for authentication between different devices in the data network, wherein a resolution of the current device timestamp is based on a current update interval that is less than the prescribed update time interval value.

17. The method of claim 16, further comprising:
if the secured request is authenticated, the content supplier device transmitting the data object as a secured data object to a requestor device having sent the secured request to the content supplier device, including:
generating, by the content supplier device, a corresponding reduced-resolution time value by reducing the resolution of a current device timestamp value of the content supplier device to the prescribed update time interval value, and encrypting the reduced-resolution time value using the encryption key, and
outputting to the requestor device the secured data object, including the data object and the encrypted reduced-resolution time value, enabling the requestor device to authenticate the secured data object based on determining whether the reduced-resolution time value is within a range of a corresponding timestamp value of the requestor device relative to the prescribed update time interval value.

18. The method of claim 16, wherein the content supplier device is a data producer of the data object, the prescribed update time interval value corresponding to a data update interval of the content supplier device.

19. An apparatus comprising:
a device interface circuit configured for receiving, in a data network, a secured request for a data object, the secured request including an object name identifying the data object and an encrypted portion;
a memory circuit configured for storing an encryption key associated with the data object;
a clock circuit configured for generating a current device timestamp; and
a processor circuit configured for decrypting the encrypted portion into a decrypted value using the encryption key, the processor circuit further configured for selectively authenticating the secured request in response to determining the decrypted value is within a range of the current device timestamp relative to a prescribed update time interval value associated with the data object and used to establish a reduced-resolution time value for authentication between different devices in the data network, wherein a resolution of the current device timestamp is based on a current update interval that is less than the prescribed update time interval value.

20. One or more non-transitory tangible media encoded with logic for execution by a machine and when executed by the machine operable for:
receiving, by the machine implemented as a content supplier device in a data network, a secured request for a data object, the secured request including an object name identifying the data object and an encrypted portion;
decrypting the encrypted portion into a decrypted value using an encryption key stored by the content supplier device and associated with the data object; and
selectively authenticating the secured request in response to determining the decrypted value is within a range of a current device timestamp of the content supplier device relative to a prescribed update time interval value associated with the data object and used to establish a reduced-resolution time value for authentication between different devices in the data network, wherein a resolution of the current device timestamp is based on a current update interval that is less than the prescribed update time interval value.

* * * * *